March 17, 1931.  A. THOMA  1,796,671
METHOD OF BOTTOMING SHOES
Filed Dec. 23, 1927

Patented Mar. 17, 1931

1,796,671

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

METHOD OF BOTTOMING SHOES

Application filed December 23, 1927. Serial No. 242,085.

This application covers the foundation method in a number of respects of a concurrent series of inventions relating to the provision of shoebottom filler in the form of a piece, preferably sheet-like, which is self-sustaining, cohesive (i. e. its elements are united or adhere to each other as a dense or impervious unit) expansible and preferably self-adhesive, and so formed and handled that it is placed as an integral piece in the shoe-bottom, said piece being constructed less in area than the cavity area of the shoe-bottom and greater in thickness than the cavity thickness or depth, so that, by my present method, this piece, when placed as stated, is adapted to be expanded to its ultimate cavity filling position and relation in the shoe-bottom cavity in said integral piece condition, then filling the cavity and being reduced to the thickness and expanded to the area of said cavity. This piece is not necessarily like a board, but yet it must be cohesive to come within my invention, i. e. a blended union of elements constituting a dense or impervious unit. I distinguish from a shapeless mass of uncertain or changing form and from a solid piece, as of cardboard or tar-paper cut to fit approximately the shoe-bottom cavity, and from anything frail and unstable or loosely connected or easily disintegrated or lacking integrity. In the most complete carrying out of my method the pieces are of standardized shape, constructed for shipping and handling with impunity as ordinary merchandise, and the filling operation is all accomplished without manual handling. My filler piece is shape-retaining and yet is preferably plastic or spreadable. One object of the invention is neatness or cleanliness, not only for the floor and adjacent part of the shoe factory (which have heretofore been commonly rendered foul and smeared with the sticky plastic filler materials) but cleanliness for the workman, and for the shoe being filled. Another object is economy of time and of labor. The usual method heretofore employed has required considerable physical strength in handling the shoes and subjecting them to manual molding and spreading of the filler in the shoe-bottoms, as a mason spreads mortar with a trowel. Also this has required considerable time. My present method largely eliminates both of these factors, requiring much less time and labor. Also my method, in the preferred and more complete steps of the method which employ heat, effects great economy of heat over the old method and eliminates the expensive machines at the filling stand.

This application is, in its chief features, derived from, and a continuation in part of, my copending applications Ser. No. 133,506, filed Sept. 3, 1926; Ser. No. 183,302, filed Apr. 13, 1927; Ser. No. 210,558, filed Aug. 4, 1927; Ser. No. 228,588, filed Oct. 25, 1927, and Ser. No. 232,279, filed Nov. 10, 1927, all of which have to do with plastic filler made as integral pieces, preferably laminated so as to contain a spreadable layer and one or more supporting skins or cover layers. In my prior Patents No. 808,224, December 26, 1905; No. 832,002, September 25, 1906; No. 861,555, July 30, 1907; No. 945,294, Jan. 4, 1910, and in a long series of subsequent patents granted to me, I have disclosed certain filler compounds which have been found eminently satisfactory as bottom fillers for shoes, such compounds in general being permanently elastic or coherent under flexure, pliable and compressible when cold, waterproof or water-repellant, quick setting, non-inflammable, heat insulating, extremely adherent to leather, and capable of becoming sluggishly fluid when heated, although capable of retaining a given shape indefinitely when confined as a filler within the cavity of a shoe-bottom. The above desirable chracteristics, together with others, are employed in my present filler, particularly when used as a "piece" as stated above, and without going into further detail as to the individual pieces I refer to my copending applications, and especially to Ser. No. 183,302, filed April 13, 1927; Ser. No. 192,076, filed May 17, 1927; and Ser. No. 211,157, filed Aug 6, 1927. My numerous patents above referred to disclose a wide variety of shoe filler materials, mostly plastic and moldable, some normally sticky, some requiring heat or other treatment to become sticky or adhesive, some being inherently stable and coherent, others not so, some being granular, others not granular, and so on, to meet all situations of the shoe filling art. The chief of said fillers is the spreadable one composed mainly of wax tailings of petroleum or other moldable, or plastic binder compounds intermixed with ground cork or other comminuted material. All these fillers were made and shipped in bulk to the shoe factory and there reduced by melting or otherwise to a shapeless, spreadable mass to be laid in the shoe-bottom with a spatula, as a mason lays mortar with a trowel. My present invention contemplates the use of any of the foregoing fillers, but in a radically different manner and embodiment. Instead of a shapeless mass and indefinite volume, I first, according to my present method, sheet or mold and compress the filler or the compressible portion thereof, if multi-part or lamellar, molding and compressing the same to a predetermined volume and standard shape and I rely upon the shiftability or spreadability of this unit mainly or at least of its extensible portion or quality for the final automatic fitting of the piece or unit to the cavity. To this end the further important step in my method consists of preferably molding or giving each unit predetermined dimensions preferably different from those of the cavity, rendering it thicker than the cavity depth and less in area than the cavity area but of the predetermined volume required for filling a single shoe-bottom cavity. In the simplest carrying out of my method the next step consists of placing the aforesaid shaped unit in the cavity, and then spreading the unit by pressure to the increased area and decreased thickness required by and for properly filling the shoe-bottom. My present method in its preferred completeness is primarily intended for filling McKay shoes, is primarily a hot method, and is primarily for filling the bottom before the sole is applied, and primarily contemplates spreading, initially at least, by a rolling pressure. In the more complete carrying out of my method I provide one side of the plastic layer, preferably before sheeting and while said layer is hot and semi-fluid, with a web which I preferably waterproof either before or as it is being applied, although for some purposes it may be within or on both sides.

Practically, this paper-like side or supporting fabric or web or tough skin is important to the best results of nearly all my novel features. Because of it as a base or carrier, the main body material may be quickly and easily compounded thereon, spread and sheeted, and is thus of particular value with sticky material, may be then molded integrally and quickly, may be cut up into definite shape-retaining pieces with certainty and facility, may be handled as pieces even carelessly, may be heat treated easily, hot-water treated safely. Such a supporting medium is readily and permanently waterproofed, impregnated with adhesive, and waxed, carries any of the chemical components desired neatly, is not destroyed, softened or distorted by the quickening treatment of the piece as a whole, but remains homogeneous, unchanged and still waterproof, and preferably becomes stronger because of said treatment, does not relax during the treatment of the plastic layer, and supplies a superior insulator against heat and cold which is of special advantage in McKay shoes with their thin innersoles and outersoles (particularly women's). As a tight, close, base in the shoe-bottom, it interposes a superior and permanent waterproof integumental element between the granular, plastic layer and the leather (of the innersole or outer sole, as the case may be). For this reason it becomes feasible to make the plastic piece without the cork heretofore used, but mainly of such different materials, but even better for the purpose, although not available under the old system and method, as various low cost by-products of expensive lines of manufacture. For example the plastic piece may consist of a daub, on said base as a carrier of rubber scrap, or other skeletons, trimmings, etc. I use the term "plastic piece" to mean an adherently integral or strongly cohesive and hence self-sustaining, handleable piece which is spreadable, at least at the time of laying, and preferably by reason of or aided by a quickening treatment. This paper-like base is preferably on one side, and preferably on one side only, and I also apply preferably to the opposite side of the plastic layer, at any time prior to the actual filling of the shoe, a dulling surface, which may be a dusting of powdered or comminuted materials which are capable of later entering into the filler and which preferably consist of or contain adhesive materials, preferably latent, and capable of acting with the other elements, preferably, as ultimate stiffeners, and absorbent and comminuted materials like cork, leather dust, linters, etc. capable of taking up or utilizing appreciable quantities of the binder, especially excess binder, of the plastic layer after the filler piece has been spread or laid in the shoe (so as to dry up or stiffen the laid layer) and preferably those whose absorptive capacity is quickened by heat, and stiffeners as such which set under the action of the heat, moisture or pressure used in the filling process including such as naphthalene which is first a solvent to increase temporarily the fluidity and spreadability and which then stiffens, and bibulous, quickening, and other elements for speeding the process (as explained later) and anti-squeak waxes (preferably also in powdery form), and preferably means for rendering the laid filler less readily responsive to heat after it is laid. If this dulling surface is applied in the course of making the original sheet, the whole is compressed with such preliminary pressure as is possible or practicable while the plastic layer is still hot. But, whether done then or later, this important preliminary step of my method requires that when said layer has cooled and stiffened, and when said dulling coating has been applied thereto, whether in the sheet or in the individual piece, the multi-layer and semi-sheeted fabric is further compressed to a self-sustaining permanently coherent condition.

Besides aiding in the molded integrity of the piece, as an individual filler unit for filling a single shoe, this extra pressure is also for quite another purpose, relating directly to my present method, for facilitating and rendering feasible and practicable the quickening treatment, especially by hot water application and especially in mass or quantity treatment. The extra pressure drives the powdery, granular elements down into the plastic layer and to some extent forces the latter slightly upward into the powdery layer so as to embed and hold the particles of the latter, so that the powder, dextrine, or other stiffening, paste-making flour or starch for example, is not washed off, jarred or brushed off, or otherwise lost in the hot water bath or other quickening (by heat, moisture, pressure, chemical treatment, or otherwise). By thus welding together and embedding and condensing together this outside layer and the original surface of the plastic layer, and particularly when the powdery layer contains in whole or in part, latent adhesive substance or substances, or any of the other substances mentioned herein and in my aforesaid copending applications and prior patents as being subservient to moisture, especially hot water, it follows that instead of being at once dissolved or fluidified and washed away and lost by the hot water, said substances remain there in situ for use in the next step of my method. This step just explained is referred to as a resurfacing in my application Ser. No. 183,302, filed April 13, 1927, because the filter piece, unit or sheet or filler material has its top surface (or it may be both top and bottom surfaces) provided with another surface, or re-surfaced, by this welding, embedding step of applying dulling powder under pressure. By this step of my method the re-surfacing powder which must be held for use, but which would naturally float away or disappear and be lost before it could be used, is forced into gripping and gripped relation to the surrounding protective particles, of cork for instance. The ground cork and the sticky binder or whatever the main filler layer or plastic layer may be, is much more stable and quite tenacious as a layer, so as to protect the powder. And if the powdery dusting contains other intermixed filler elements, such as cork, cotton linters, mica flakes, talc, chalk, leather dust and the like, along with the dextrine, flour, pulverized glue, resins, shellac, albumen, silicate of soda, plaster of Paris, powdered wax, asphalt, paraffin colloids, cellulose or wood pulp, casein combined with lime, etc., the interlocking, matting, supporting and protecting object is attained even more thoroughly, so that the powdery components will not be lost in handling or in quickening, but will persist, in softened pasty form, in sufficient amount and relation even though the piece or pieces are carelessly left in the water, or other treatment, an undue length of time. The object is to provide first the dulling effect in durable form and yet ready instantly to introduce the stiffening and drying and heat-resisting effect in the layer as a whole, in the shoe, and the top surface anti-squeak effect. However I do not desire too firm a surface or resurfacing, but only adequate protection without slowing down the hot water treatment or other quickening step. Speed is equally my object, along with the neatness of shop, workman and shoe, ease, accuracy, thoroughness and simplicity already mentioned. I do not limit my method to any particular mixture or choice of elements, as all the foregoing are mentioned and explained in my copending applications and I intend to utilize in the various steps of the preferred method any and all of the materials of my said applications and the patents before mentioned. It will be understood that I am describing the preferred steps. Among the waxy powders or granules I have mentioned paraffin. This and others of the anti-squeak substances may be employed in their usual film-like coating by being painted, dipped or smeared on in fluid form, setting as a thin covering over the powdery layer, or, in case the latter is omitted, then directly on the main filler layer. Such material, whether as powder or a film, may be amenable to the heat of the hot water and to the still later hot rolling step.

The next step is to quicken or render active the surface material and preferably the entire filler piece. Preferably this quickening is by moisture, preferably by dumping a large number of the disconnected pieces into a large container of hot water. In my application Ser. No. 210,558 I have set forth a cold method. The present method is primarily a hot method. But it will be understood that certain steps or separate portions of each of said methods are not limited in these respects. Also my present method is not limited, except as otherwise stated in certain claims hereinafter, to the kind and arrangement of filler piece so far described. For example, my method is new in providing a self-contained, handleable piece capable of being quickened into stickiness, so quickening the same, and spreading and securing the same in place by pressure. Accordingly I intend this step to be covered herein broadly, irrespective of such features and structures as may be additionally necessary for other claims. These steps and certain of the claims relating thereto are derived from my application Ser. No. 228,588, as also to like extent the anti-squeak feature. As a further illustration of the breadth intended herein, or the foundation character of certain steps of the method, I point out that my method is new in providing a self-maintaining, coherent, self-supporting or integral piece or unit of different shape and size from the bottom cavity and which is extensible and preferably plastic, and filling the shoe-bottom cavity by placing and then deforming the same, as by expanding, or spreading as the case may be, such a piece therein by pressure, irrespective of whether subjected to any pre-treatment or not and whether lamellar, or constructed in any of the other special respects herein. This step and certain of the claims herein are derived from my application Ser. No. 210,559 (as well as from Ser. No. 133,506). These citations or examples are sufficient to make it clear that I am including a wide range of novelty and steps and variations, in the preferred steps and sequence which I have been describing.

One important element or feature already mentioned as preferred is the bottom support or shape-retaining layer. But, in the broader aspects of my method, as relates to this element, instead of placing the supporting layer on one side externally of the sheet it may be placed centrally within, or several of said supporting sheets may be employed, including one on each side, or other forms of internal or external support may be employed as set forth in my copending applications.

Continuing now with the further steps of the preferred carrying forward of my method, I point out that I have provided both surfaces with filler material, the main supporting surface being in integral sheet form ("paper-like") and the opposite surface in granular form of materials capable of later sinking into the plastic body and forming an ultimate sticky or adherent element or component of the laid filler but until laid constituting a non-sticky exterior for insuring the neatness and economy in handling as aforesaid and capable because of its granular and other characteristics, of facilitating the final spreading and the speed and ease of filler laying. The preferred composition of the plastic layer is set forth more in detail hereinafter. The piece or unit as thus molded or shaped is capable of sticking in place as a piece with its own inherent stickiness, under pressure, or may contain special external adhesive, and in either case the stickiness is held temporarily inactive and substantially dry externally for neatness and convenience and speed of handling and manipulating. Next, the pieces or units, if still connected in the form of a large sheet, are preferably pulled or torn apart or otherwise severed into a plurality of distinct individual pieces or a string of pieces and subjected to a moistening or other quickening treatment. I prefer to avoid individual handling, although, if preferred, the operator may dip them one by one as he fills the individual shoes (as shown and described in Ser. No. 228,588 and Ser. No. 228,235). The quickening may be of any of the means set forth in my copending applications. Preferably the now thoroughly quickened pieces are taken from their quickening treatment and, if they were in a hot water bath, are drained or are dumped on a draining and tempering stand, having an inclined portion or supply table on which the individual units or filler pieces may slide one by one. This table has a relatively high heat at one portion and a lower heat at another portion so that if the operator works at high speed he shifts the filler pieces to the high heat according to his speed, with the result that the said piece is thereby steamed or it may be resteamed or super-steamed (in case the previous treatment was a steaming treatment), the moisture being driven in appreciably by the hot table or plate so as appreciably to soften the binder within the piece and to properly change the external paste (formed by the wetting of the cementitious external layer of the piece) into highly sticky adhesive. The piece is then slid into the shoe which is held in proper position therefor at the lower edge of the inclined table or hot plate. This sliding operation takes place from one stage to the next and with such rapidity as the operator is capable of. If the operator is relatively slow he simply moves the piece over the portion of the hot plate which is not so directly or highly heated. Any mode of handling the piece is within the purview of my broader claims, but this feature of sliding or transporting without manual engagement of the piece by the hand is of importance and covered as an important step in certain claims. I have found that in practice a careless or very speedy operator is apt to take hold of the soaked or thoroughly softened and quickened piece improperly, or with too careless or strong a grip and thereby punch his finger through the piece or shift the paper or supporting layer thereof, or even in an extreme case cause the piece to distintegrate entirely, besides smearing his hand and tending in consequence to soil the shoe. And I have found that the individual dipping of each piece by hand (see Ser. No. 228,588) was not only slow but the average operator would not dip enough of the piece or adequately dip it, especially if in hot liquid or in certain chemicals. Hence I have devised, as a preferred step of my method for securing speed, thoroughness and uniformity, means, as for instance the sliding, for making it possible to avoid actual grasping or manual handling of the piece and making it possible to get the pieces in large numbers together moistened or quickened and each actually into the shoe without such handling and without distorting pressure or engagement. The heat treatment is preferred, because it is of course effective externally and is also penetrative so as to quicken the chemical action within the piece, particularly when the piece contains chemicals intended to break down, unite or interact, such as set forth for instance in my application Ser. No. 211,157.

Having gotten the standardized unit thus into place along the approximate center of the shoe-bottom cavity, the same is then spread. This spreading may be of any kind desired, by vertical pressure, leveling, rolling, or any method whatever, so far as the preceding steps of my method are concerned, considered broadly, but in following my method still further in its preferred steps, the spreading is accomplished by pressing a roll against the quickened piece as just deposited, this manner and means being preferred because this rolling pressure tends best to intermingle the powdery elements, especially those for drying and those for stiffening the plastic layer. But, instead of simply running the roll lengthwise of the piece from end to end in an obvious manner, the roll is first engaged at the lengthwise middle of the piece and is thus engaged with considerable pressure, being then rolled from said center or middle toward one end and then back the entire length. The result is that the piece is stuck fast temporarily by the initial downward pressure at the middle without possibility of shifting for the moment and is then safely molded and spread as desired. Said spreading brings into effect a permanent and substantially perfect adhesion with all the adjacent surfaces and cavity edges of the inturned upper and lining and effectually closes, by means of the paper covering the tack hole or holes (always left in the innersole where it was first tacked in place on the last). Because of the engagement with the filler piece first at the middle as stated with considerable pressure, the piece is thereby stuck fast before there is any tendency to shift it in any way. If engaged by the roll first at one end as in the more natural manner of rolling, the result is usually that the piece is slid along as a whole out of place and the paper support is liable to be slid off, or, rather, the plastic layer slid off from the paper support. Whether the latter results or not depends to some extent on whether the plastic layer contains paste-forming ingredients (as it preferably does in my preferred method) and on the particular kind of quickening treatment and on the character of the latent adhesive or other materials in connection with the original dusting and on whether said support is porous and how slimy the quickening bath has become, etc. In addition to the stiffening and stabilizing functions of the dusting or coating, one reason that I prefer said dusting or coating of the top surface of the piece with a comminuted or granular and preferably latent adhesive coating, instead of a top supporting layer in the form of paper or other thin sheet fabric, is that said paper or sheet, when treated in the hot water bath or other unit-softening treatment and then engaged by a hot roll in the shoe bottom, is almost certain to be stripped off. The hot roll tends instantly on touching the wet sticky paper to dry the paper at the point of contact and set the adhesive therein in adherent engagement with the roll, and then, as the roll turns, it tends to remove the paper, or if the latter is strongly adherent to the plastic layer, it simply tends to tear off the paper in fragments. It tends also to soften the binder, so that the released paper winds readily onto the roll. In the rapid filling of shoes the roll therefore gets quickly loaded with paper or other sheet fabric protectors, which the heat dries on or cements on hard, thereby being difficult to remove as well as seriously interfering with the filler laying process. All this is obviated by providing the powdery layer, and the latter, instead of interfering with the action of the roll, cooperates with the roll in aiding the spreading by itself being granular and spreadable, and in leaving the final surface most highly sticky because of the simultaneous heat treatment and pressure of the roll. Being granular, the top surface offers no resistance to the lengthwise spreading movement, as the grains separate or readily break up and move along with the spreading layer underneath, and for the same reason offers no appreciable resistance to the upward penetration of the wax tailings or other meltable binder in the plastic layer which it is desirable should ultimately rise to the top surface of the laid filler piece. This is for the purpose of restoring the original sticky surface (of wax tailings, for instance) to its condition before its resurfacing, and ultimately sticking the filler piece to the inner surface of the outer sole, and also for the purpose of uniting with the dusting ingredients in rendering the entire top surface of the laid filler and the engaged surface of the outer sole anti-squeak. Said ingredients would have been lost before this stage in the method, if simply dusted on in obvious manner to give a dry surface for handling, but the resurfacing step under embedding pressure makes it possible to insure the presence of the desired ingredients at this later stage of the method and in an active condition and now united and properly intermingled with the other elements for the final step, as just explained.

The final step in my preferred method is five-fold. By one and the same act I stick fast the piece, spread it lengthwise, spread it widthwise, quicken and bring actively and permanently to the surface the anti-squeak elements of the piece, and render the entire top surface of the filled shoe cavity and its enclosing boundary permanently anti-squeak. To this end I employ a pressure roll slightly larger at its lengthwise middle and use it hot. When, therefore, the shoe is rolled lengthwise as above explained, the middle diameter of the roll brings a lengthwise alignment of pressure along the lengthwise middle of the filler piece, and causes a lateral shoving or spreading of the plastic layer toward the sides of the cavity in a superior degree, at the same time that this same movement results in anchoring the piece against endwise movement as a whole piece and against shifting improperly or twisting flatwise, inasmuch as the greatest pressure is applied first transversely of the piece at its lengthwise middle and is then applied by said enlarged central diameter of the roll along the widthwise middle of the entire piece, while the heat of the roll quickens, brings to the surface, amalgamates and spreads the anti-squeak elements of the piece over the whole bottom by first smearing the roll therewith and then through the roll transferring and rolling the same as an anti-squeak coating on the inturned surface of the upper as well as smearing the filler surface evenly therewith. The usual custom in spreading a plastic filler in a shoe-bottom by means of a roll (as for instance in my Patent No. 1,310,588, dated July 22, 1919, or Patents No. 1,512,229, dated October 2, 1924; No. 1,523,701, dated January 20, 1925; or No. 1,558,699, dated October 27, 1925) has been to move the shoe with relation to the roll lengthwise for getting the filler spread properly to the toe boundary of the cavity and toward the shank and then moving it more or less sidewise at various angles so as to get the filler spread laterally out to the side boundaries of the cavity. I am aiming by my present method to accomplish all this with simply the lengthwise movement above explained.

The aforesaid spreading, broadly considered, of the plastic portion of the self-supporting filler piece, without limitation as to manner or means, is the most important feature of my invention and the chief foundation step of this and my other copending method applications and it is involved in the further radically new feature effected simultaneously with and by the spreading step) of the permanent and substantially non-shiftable uniting of the filler piece as placed and spread in the shoe-bottom. This uniting consists preferably of permanently sticking or fastening the filler in place and in final position by spreading the plastic sticky filler material beyond the edges of the skin or support (and of the skins, in case the piece has a top and bottom cover skin) and causing the same thereby to adhere strongly to the adjacent surface. In case the spreading is done before the outersole is secured, it puts the parts in place for union with the outersole whenever secured and levelled. This method gives to the McKay shoe as even and comfortable a filled bottom as the best welt shoe.

Other steps of my method will appear in the further description in connection with the drawings in which I have attempted to illustrate graphically, but without encumbering the application with all the details of the actual apparatus, the various steps of my method in its organized detail and preferred or most complete development. Moreover, while I have shown and explained my invention as applied to filling a McKay shoe, it will be understood by those familiar with shoe manufacture that in most of the new steps and features constituting my invention it is not restricted to a McKay construction.

Figure 1:
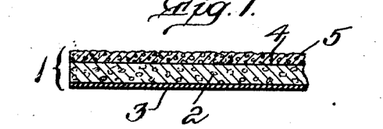
Fig. 1 is a sectional view of a plastic filler piece provided with a top layer of dulling materials and a paper-like layer on its bottom surface.
Figure 2:
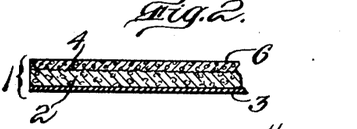
Fig. 2 is a similar view of the same piece after subjection to the resurfacing operation or the first step of my method, showing said top layer welded on and embedded into the top surface of the piece, as it was originally.

As already stated, the present method application is intended to be generic to cover in the broadest respects the features heretofore set forth in this application, as applied to any and all of the various constructions of filler pieces disclosed in the copending applications already mentioned to which, therefore, reference is made for said constructions, and it will be understood that for this reason I have not undertaken to show the same herein. In Figures 1 and 2, however, I have illustrated a typical filler piece 1 for more readily making my method clearly understood, in which an expansible layer 2 of filler material, herein shown as being not merely expansible but plastic and spreadable, is provided with a paper-like support, carrier, or cover layer 3 on its underside, preferably waterproof treated and it may be impregnated also with latent adhesive for facilitating its temporary adhesion to the inner sole when first laid in the shoe-bottom. On the top surface 4 of the parts thus far mentioned I provide a copious layer 5 of powdered materials to constitute the resurfacing layer when subjected to the subsequent pressure which is at the foundation of certain important features of my method. Having provided the parts as shown in Fig. 1, the first step of the method is to subject the same to considerable pressure whereby the powdered or comminuted surface layer 5 becomes pressed flat and welded into the surface 4 so that the coarser ingredients thereof are actually embedded in or into the layer 2 and all the components of the dusted or powdered layer 5 are welded together as well as superficially united with the layer 2 to constitute a resurfacing or substantially dry layer 6. The layer 2 consists, at least in part, of binder, such for example as wax tailings of petroleum, and granular or other body material, such for instance as ground cork, and under the pressure step just mentioned, more or less of this binder of the layer 2 is disturbed and driven upward into holding engagement with the particles 5, so that there is an intermingling sufficient to insure the functioning of said layer 6 in the way required in the following steps of my method. It will be understood that the filler piece, prior to the resurfacing pressure just mentioned, was originally subjected to some forming pressure sufficient to sheet it in the original process of making the filler, and that the resurfacing step just explained is an additional or further pressure and is primarily for preserving for further and final use in the top coating layer 6 those powdery granular elements which I rely upon for carrying out the rest of my method. The filler as mainly dealt with thus far is of the plastic kind, which was originally melted in order to be sheeted or gotten into individual pieces. One feature therefore of my present method consists of getting this kind of filler into integral, coherent, self-sustaining pieces by a two-pressure process (so that each piece can be placed in a shoe-bottom as a piece), and again restoring said filler material to a softened, loosened condition for easy spreading in the shoe-bottom. In other words the first part of my method consists of two main steps, viz first hardening the filler into a shaped piece spreadable if at all with only great difficulty and extreme pressure, and, second, then softening the filler so that it is spreadable easily and with slight pressure. Said first main step calls for two pressures, one pressure when the original material is hot, for giving it a preliminary sheeting and levelling thereon the powdery layer, and the other pressure when the filler is cold or nearly cold for welding or embedding into the plastic layer the powdery materials so as to hold and grip said materials to preserve them against being brushed off, abraded or otherwise lost, and to give a compactness, rigidity and coherence to the entire piece necessary for the free handling thereof as an integral piece. Said second main step also preferably calls for two treatments for again loosening the piece to a considerable degree of its original softness, but not quite, as it must still remain intact for delivery to the shoe-bottom cavity as a piece, in accordance with my present invention. The first of these two treatments is for quickening and releasing from their restraint the elements which were previously restrained, dulled and unified, and the second of said two treatments, which is usually preferable, consists of a sudden extra quickening so as to render the various elements capable of their maximum cooperation at the very time of laying and spreading. This brings me to the next part of my method which also consists, broadly considered, of two main steps. This second part of my method, broadly considered, relates to getting the thus softened and readily spreadable or extensible piece properly as a layer in the shoe-bottom, and restoring it again to its stiff, durable, coherent or permanently intact condition, substantially the same as in the original commercial piece, or preferably even more condensed and immovable. The first step of this second part of the method, is accomplished while the piece is in its highly quickened and therefore readily spreadable or readily manipulated condition, and consists of securing and spreading the same in place. This step is accomplished usually without very much compacting or condensing and hardening of the filler layer. The next step consists of fully compacting, condensing and hardening the laid filler and is accomplished by pressure applied after waiting long enough for the filler to part with its heat and become substantially set and fixed, but still compressible in the same way and for the same reason as originally in the second pressure of the first part of my method. This final compression may be accomplished by a second rolling application or may be accomplished after the sole is laid, by the levelling pressure. By this method therefore it becomes not only possible but easily and highly practicable to accomplish at one and the same time and preferably by the same operation the spreading, intermixing, stickiness developing, anti-squeak surfacing of the filler layer and anti-squeak coating of the inturned upper leather, all on and in the top surface, and at the same time and by the same act on the bottom surface to anchor the piece itself by means of its bottom support or skin and to spread the sticky layer beyond the edges of said skin and to cause the piece thereby to adhere strongly and permanently in place throughout all the bottom area of the cavity surrounding said skin. My present method aims to secure such high degree of speed and efficiency as has heretofore been considered impossible in shoe manufacture and also aims to make possible the filling of McKay shoes at the same high speed and efficiency as with Goodyear or welt shoes. Therefore, as one means of securing speed, I provide the filler in the first place in the form of self-contained handleable individual pieces, as above explained, and I construct and arrange these pieces so that they can be subjected in large measure to such miscellaneous handling as the varying exigencies of the different factories and other reasonable requirements, whatever they may prove to be, may call for, all as also above explained. To make the method practical and commercial, it is necessary to have a safety margin beyond the actual theoretical requirements in the foregoing respects. Hence I not only construct the pieces so that they will not stick to each other, and so that the top surface 6 is durable so as to remain substantially dry and non-sticky as stated, but primarily so as to hold within itself against possible loss those ingredients which are to be depended upon in connection with the following steps of quickening treatment, particularly when using hot moisture. The protector 6 is referred to in my copending applications under the various terms of integument, skin, shell, crust and protecting cover or layer, and preferably contains absorbent materials such as short fibres, wood pulp, ground cork (which takes up externally considerable of the binder when freed and intermingling therewith in the later portion of the process), cotton linters, leather dust, and various powders, and contains preferably among the powders, dry adhesive such as dextrine, pulverized glue, shellac, paraffin, waxes, casein combined with lime, capable of acting first as sticky substances and then as stiffeners and heat-resisting stabilizers in the final layer, and contains preferably other colloids, and other dulling, anti-squeak substances such as mica flakes, talc, chalk, plaster of Paris, and mixtures of any of the foregoing, or in other words the top layer or non-sticky, dulled, substantially dry cover 6 preferably contains not only the necessary dry elements but absorbent elements, anti-squeak elements, and adhesive elements, all capable of fuctioning together in a preliminary way as means for giving the otherwise sticky filler piece a non-sticky, durable and handleable, substantially dry construction, and then functioning later in the manner primarily intended for the various elements respectively in their chemical cooperation and as filler elements. For instance in my application Ser. No. 228,588 other means and arrangements for obtaining the desired results above mentioned are stated whereby the paraffin or other waxy, oily or fatty coating material is caused to produce an otherwise highly anti-squeak surface. For example the paraffin mentioned may be mixed in with the dusting as a powder for securing the dulling in that way with the rest of the materials, or as a liquid it may be painted on or otherwise applied in any way as a thin film, as by dipping the piece in paraffin heated to a highly fluid condition, in which case it hardens and serves as a thin protecting coating directly as constituting the coating 6 on the layer 2 or as a part of the coating 6, serving, in either case, two-fold purpose of providing a neat non-sticky cover and of later providing an anti-squeak element becoming effective on the hot face of the spreading roll during the spreading of the filler piece within the cavity. The paraffin is preferably admixed with tallow, stearine, hard waxes (such as carnauba, for instance), or other ingredients of a dulling waxy nature so as to render the mixture firm on the one hand and to give it a higher melting point on the other, and render it more adhesive. The paraffin or like coating material acts also under the influence of the hot roll as a slickener to facilitate the spreading of the filler mass when the hot roll is pressed against the mass. Paraffin and the other waxy, anti-squeak elements are caused to flow readily by the heat contact and are thereby carried entirely over the laid filler and all parts of the bottom with which the spreading roll may come in contact. Also the various slippery elements (talc, mica, etc.), especially when mixed with waxy materials, oils, resins, pitches, or gums, to a putty-like or smeary paste condition, constitute likewise a superior anti-squeak surface with or without graphite, soapstone, or powdered non-absorbent magnesian minerals. Various of these alone give an anti-squeak surface. Sticky wax tailings also alone makes an anti-squeak surface.

It will be understood that, so far as my method is concerned, I am simply giving sufficient illustrations to make the method clearly understandable and to show its extreme breadth of novelty. If the binder of the plastic layer should contain drying oils, preferably the resurfacing layer would be provided with driers whereby the said drying oil or oils would be influenced to set, such as litharge and sugar of lead. If the plastic layer contains rubber cements or similar binder, the surface coating 6 would contain ingredients whereby said binder, would be influenced to set, such as sulphur, litharge and other vulcanizing agents and accelerators.

Next, especially when aiming primarily to secure speed in the shoe factory, the workman takes a large quantity of the pieces and subjects them to a quickening treatment. For example he dumps them into hot water. The extra pressure whereby the powdery materials have been driven into the surface 4 so as to be actually gripped and held in place as a part of the piece with sufficient tenacity so that there is no danger of their being rubbed off, brushed off, or even washed off under any reasonable handling and treatment, makes possible this quickening treatment in quantity and it also makes possible the somewhat careless treatment of the pieces as to temperature and time. By this I mean that the water (still using the same illustration) may be cold, warm, or actually hot, and they may be left in this bath a short time or a long time. For instance, although primarily intended to be subjected to the bath for a short time only, say ten to thirty minutes, nevertheless by actually embedding and condensing the layer 6 into the relatively hard embedded condition by the pressure explained, the pieces may be left in the bath even over night and still have enough of the adhesive left on and near the surface of each piece to accomplish the filling operation properly. Under such extreme treatment some of the surface covering materials in the layer 6 will have been dissolved out and lost but enough will have been retained. The quickening treatment may be by heat, wet or dry, water, cold or hot, moisture or vapor, chemical, pressure, or any of the means mentioned in said copending applications.

Figure 3:
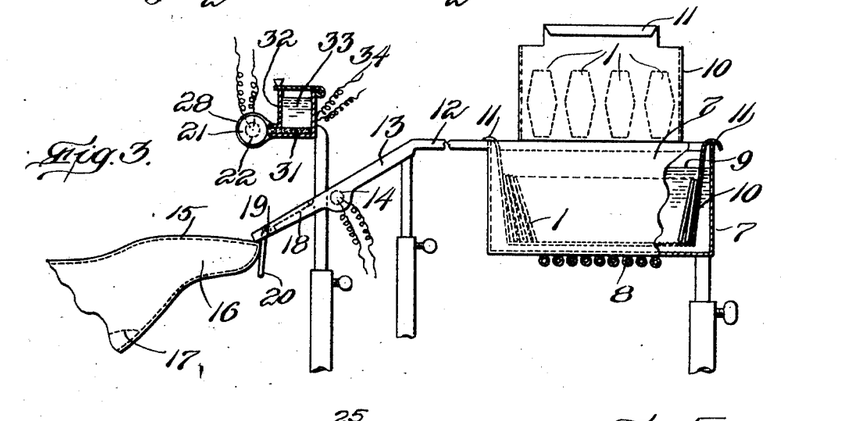
Fig. 3 shows in side elevation, and somewhat diagrammatically the hot water quickening or pretreatment step, draining, steaming, and delivering the piece to the shoe-bottom cavity.

Preferably the pieces are arranged in "case" lots, in accordance with the usual method of making shoes, and accordingly, reverting again to the water quickening treatment method which I am using by way of illustration, said pieces are placed in a water container 7, herein shown as heated by steam pipes 8 and containing water 9, the pieces being placed edgewise in a foraminous piece carrier 10, which constitutes one form of strainer, being shown as provided at its ends with handles 11. The pieces 1 are set therein edgewise in an upright position and then tipped slightly as shown in Fig. 3 so that thereby they become slightly spread apart so as to let the water get between them. When properly and thoroughly quickened the pieces are removed by lifting the oblong piece-carrier 10 from the container 7 and resting it for instance as shown in Fig. 3 so as to drain the pieces during the quickening treatment of a second batch of pieces in another piece-carrier, placed in the container as the first one has been lifted out. Then the drained quickened pieces are dumped on a stand 12 whence they are pulled or pushed as required, or slid along, onto a hot plate 13 provided adjacent one end with any suitable heating means, as an electric cartridge unit 14, which completes the quickening process. My purpose is to convert the water contained in and on each piece into steam and thereby drive the moisture into the piece appreciably. By having the heat localized as by the electric heater 14 adjacent one end only of the plate, the result is that said end of the plate has a high heat while the other end has a low heat or in Fig. 3 it may be considered that the upper portion of the plate has a low heat whereas the portion of the plate close to the element 14 has a high heat. The provision of these two different heats is to accommodate different classes of workman. A rapid workman will soon find that he can handle pieces directly over the high heat portion of the plate as fast as said pieces slide down thereon, whereas a slow workman can only use the low heat portion of the plate, and a workman of intermediate speed will keep the low heat portion of the plate full of pieces being gradually steamed or dry-heat softened while he employs a high heat for an occasional piece only.

Having now brought the piece to its proper condition of quickening, it is slid off from the plate into the shoe-bottom 15. The shoe 16 on a last 17 as usual, is shown with its bottom 15 upturned in position to receive the quickened, softened, sticky piece. It will be understood that, as this is a method case, I am properly refraining from going into structural details of the apparatus employed. Therefore I will simply mention without describing, the fact that preferably at the lower edge of the plate 13 I provide a flopper or tip plate 18 hinged at 19 which may be operated by the foot or otherwise, being herein shown as having an arm 20 projecting therefrom in position to be engaged and operated by the forward end of the shoe as the operator pushes the same forward into position shown to receive the treated piece. Instead of sliding the pieces, it will be understood that they may be directly lifted and handled by the hands of the operator. However one of my main objects is to secure neatness. The old method of filling welt shoes (as set forth for instance in my Patent No. 1,310,588 and in No. 1,512,229) even when done with the greatest care, has resulted in soiling the shoes more or less, soiling the operator's spatula-manipulating hand, and in covering the floor and machine with the drippings of filler, which later must be hoed and shoveled away, while inevitably being tracked around the factory. Accordingly I have devised the present method which preferably eliminates all handling. On the other hand the operator may dip the piece by hand if he prefers. In view however of the relatively copious surfacing 6 now highly slippery and adhesive (with the quickened dextrine etc.) and the prolonged quickening treatment whereby the entire piece is preferably rendered relatively soft for making it easily amenable to pressure, it is desirable that the operator shall not grasp the piece in his fingers. In case he does so grasp it, especially when thus sticky, slimy and slippery, there is liability of his using too much pressure and thereby punching his fingers not only into, but possibly through, the piece or otherwise breaking or distorting the sheet-like layer. By providing the slide-surface and by preferably having it inclined so as to offer a gravity impulse down its smooth surface, the necessity of grasping and raising the piece bodily is obviated. In other words my present method makes it possible to conduct the entire filling operation with the neatness which has long been desired but not attained.

Figure 4:
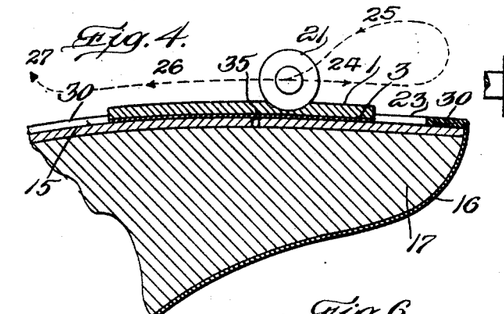
Fig. 4 shows in longitudinal section said quickened piece as thus delivered and being fixed and spread.
Figure 5:
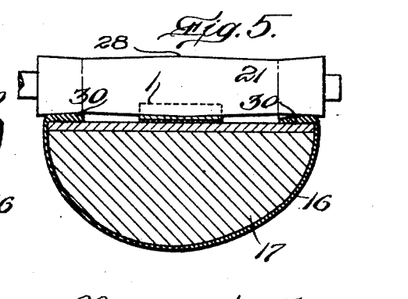
Fig. 5 is a cross-sectional view, taken along the roll.
Figure 6:
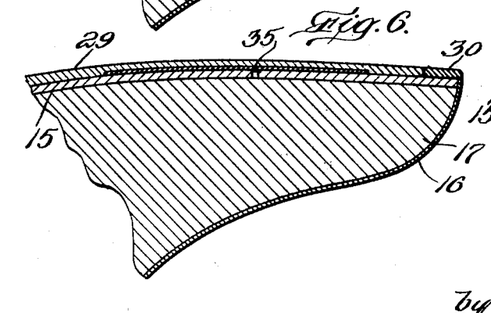
Figs. 6 and 7 are views respectively the same as Figs. 4 and 5 but showing the filler piece spread or levelled.
Figure 7:
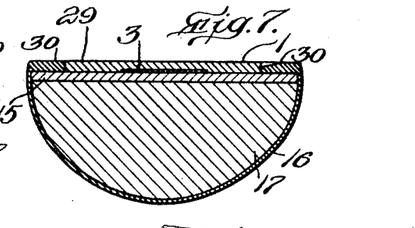

The quickening treatment as above explained, has rendered the bottom support or paper layer 3 less adherent to the layer 2 so that it may be somewhat loose and therefore it becomes necessary, in employing the steps of my method as thus far explained to fasten said quickened piece in the shoe at once against shifting. The main object of getting the piece into the highly plastic and spreadable condition which it has now reached is to spread it or "lay" it properly, easily, and speedily in the shoe-bottom. This cannot be done in the ordinary way of rolling it from end to end or of smoothing it with a laying tool such as a spatula or other common filler molding tool as the piece would instantly slide endwise or sidewise, possibly leaving its paper support in place and sliding off, and probably slip over the edge of the cavity entirely out of the shoe-bottom. I obviate all this danger by immediately applying vertical pressure across the middle of the piece, preferably by a hot roll 21 (shown in Fig. 3 as heated by an electric cartridge unit 22) pressed at the length-wise middle of the piece 1 in the shoe-bottom cavity 23 with considerable pressure as shown in Fig. 4, which fastens the piece, to be then rolled forward or back from that point, preferably forward in the direction of the arrow 24 and then back in the direction of the arrows 25 and 26 and off as at 27. Or first from said middle rearward in the direction of the arrow 26 and then back from the rear end forward and off at the toe. The result is that the first pressure of the hot roll at the middle of the piece sticks the piece immovably in that spot (by the impregrating adhesive of the carrier or support 3 or the sticky plastic 2 spread laterally at said middle into adherence with the leather at each side of the part 3) so that the forward spreading movement of the roll does not tend to shift the piece bodily and the succeeding rearward movement of the roll completes the spreading movement with safety. Preferably the mounting of the roll is stationary and the shoe is manipulated with relation thereto in the hand of the operator, it being preferable, and one object of my method, to restrict this manipulation to a simple lengthwise movement without any usual sidewise or other movement. To guard still further against possible shifting or slewing around of the smeary, slippery, quickened piece in the shoe-bottom cavity I may provide the roll with a slightly enlarged diameter at its middle 28 as shown in Fig. 5 so that thereby, as the transverse middle is stuck by the first pressure, so the lengthwise middle of the piece is similarly stuck by an extra pressure as the roll proceeds along the piece lengthwise. Incidentally this also serves to tend to spread the piece more effectively laterally. In other words by shaping the roll as shown in Fig. 5 like two cones with their large ends together, the piece is given simultaneously a positive lateral spreading impulse along with its lengthwise spreading impulse. The result is that the plastic piece 1 is now spread thin in bottom cavity filling position as indicated at 29 in Figs. 6 and 7. As the piece is being rolled from the position shown in Figs. 4 and 5 to the position in Figs. 6 and 7 the roll, in moving over the plastic quickened layers 2, 6 not only thoroughly amalgamates said layers and brings their constituents into the most highly quickened condition, for serving later their ultimate functions of drying, stiffening, and binding the laid layer and making it more heat resistant and rendering the surface anti-squeak, but the roll becomes itself smeared with the various elements thereof and especially with the anti-squeak elements. For instance it brings to the surface to a high degree the wax tailings. Incidently this leaves the spread filler in such a condition that it will tend to adhere tenaciously to the inner side of the outer sole when applied to the shoe-bottom. Another purpose is to transfer the surplus anti-squeak material from the surface of the filler to the adjacent inturned edges 30 of the upper 16 so as to render the shoe anti-squeak. This is particularly important in a McKay shoe. One main reason of the lack of general popularity of the McKay shoe is that it almost invariably squeaks. Said squeaking is almost wholly caused by the engagement of the outer sole with the upper along the surface 30 (and also over the entire shoe-bottom because of the common use heretofore of hard sheet fillers such as died-out pieces of leather or cardboard). The hot water treatment or other quickening treatment renders active the latent adhesive and other stiffeners (dextrine for example) and softens the layer 2 and then as the now sticky piece is laid in the cavity bottom the pressure rolling thoroughly mixes the quickened cover layer 6 down into the softened layer 2 and brings the waxy anti-squeak elements of the latter up along with such anti-squeak elements as were previously dormant in the layer 6. The exposed and now uppermost waxy anti-squeak element is further quickened by the passage of the hot roll so as to bring to the surface or render active a quantity of the anti-squeak wax and other material therein or thereon sufficient for treating the shoe-bottom. As the roll goes over the shoe-bottom it simultaneously heats and brings to the surface all the anti-squeak waxy, greasy, fatty or oily material, or quickens said material or materials to a permanently anti-squeak condition and spreads it as a surface coating, so coating the roll that it does not tend to pick up the plastic or spreadable portion of the filler layer as the latter exudes or spreads laterally and it also transfers enough of the anti-squeak material over the inturned edges 30 of the upper to complete the anti-squeak treatment of the shoe at the only two places where the squeaking usually takes place. One common embodiment of my filler piece has the plastic layer between two paper-like layers, one on the bottom as at 3 and the other on the top on one side or the other of the layer 6 and in either case the top paper-like layer when engaged by the hot roll, after the softening pretreatment, is very apt to stick to said roll especially because of the drying effect of the roll on the water softened powders and be pulled thereby or rolled off therewith away from the rest of the piece as a whole or as a fragment. Even if the filler piece does not contain such a sheet-like top layer, the roll tends to pick up more or less of the granular material. The heat of the roll tends to dry onto the roll or encrust thereon the pasty elements because of the sudden evaporation therefrom of the water when engaged by the hot roll. This is liable to be aggravated if linters or shredded cork be contained therein. Hence I have found it desirable and sometimes necessary to provide a cleaning pad or brush to keep the roll clean and smooth. In Fig. 3 this pad or brush is shown as a piece of felt 31 provided in the bottom of a cam 32 which contains melted waxy, oily or fatty coating material 33, kept properly melted by any means as by an electric heater 34. By using such waxy anti-squeak material 33 it becomes less important to save all the wax coating which the roll receives from the filler piece as it is supplemented or replaced by the same from the can 32. The paraffin or other oily or waxy or fatty coating material 33 is preferably melted to a highly fluid condition so that the felt 31 can readily convey the same to the surface of the roll thereby tending to maintain the roll in a clean and highly efficient condition at all times, and it may be, tending to convey an excess amount of anti-squeak material to the surface of the roll so as to insure that enough anti-squeak material in a hot, highly fluid condition shall be transferred by the roll onto the inturned edges of the upper whose cold surfaces (being still tempered at this stage of the manufacture of the shoe) therefore operate to chill the coating thus deposited so as to receive it and maintain it as a surface deposit without liability of being absorbed and disappearing, but it remains as an effective, permanent lubricant or anti-squeak coating between the two otherwise dry, rubbing, squeak-producing surfaces. Thus by the same action of the roll, preferably hot, the bottom layer is spread (if of a spreadable nature) and heat treated to develop permanently the anti-squeak surface, and the crimped inturned upper layers (of upper leather and lining) are given an anti-squeak treatment. The same pressure rolling treatment spreads the plastic portion of the filler (or at least extends it, whether spreadable or not) and thereby secures the piece permanently by reason of the sticky portion of the piece now spread beyond the supporting element 3 all around the same throughout the rest of the bottom of the shoe-bottom cavity. An important result of the foregoing treatment is that the tack hole 35 Figs. 4 and 6 is effectually covered or closed against the admission thereto of staining materials which commonly stain the foot or foot covering of the wearer. In making McKay shoes the innersole is always first tacked on the bottom of the last by a tack through the forward end and another tack through the heel end of the innersole. When the upper has been crimped around and fastened to the innersole and last these tacks are withdrawn leaving the holes, and one of the serious objections to McKay shoes has always been the liability of staining the foot covering through the hole in the forepart. By providing the supporting piece 3 in connection with the filler piece so as to cover this tack hole and then sticking the filler fast all around this cover layer, the result is that my method automatically closes the tack hole.

Another object is to leave the laid filler as dry and stiff as its spreadable nature will permit but nevertheless it is necessary to have a considerable amount of binder therein, for example wax tailings, which I have termed in my article applications excess binder because more than wanted ultimately. The pressure treatment just explained, especially in connection with the support 3 results in squeezing out or flooding out beyond the edges of said support 3 a considerable proportion of the now fluidified binder. This accomplishes two objects, first it leaves the body portion of the layer stiffer and drier and it floods over the surrounding surface of the bottom of the cavity the superior adherent binder as a film of extra stickiness between the leather and the rest of the spread or squeezed out layer 2 and this sticky film as thus flooded out tends to chill instantly and stiffen into permanent strong adhesion between the leather and the ground cork as soon as it contacts with the cold tempered leather. Also the same pressure of the hot roll quickens into the highest state of activity the adhesive which was originally latent or at least not on the surface. The heat also tends to develop the absorption of the binder by opening the pores of the linters, fibers, and various dehiscent components provided to get rid of the excess binder after the latter has fulfilled its original function. Further to speed up the operation I preferably provide in the coating and in the mixture additional water absorbent, bibulous materials which therefore hasten the effect and shorten the time of the water treatment, by drawing the water or other quickening fluid more readily and more rapidly into and onto the piece or the filler unit so as more quickly to condition or quicken the same and get it ready for application in the shoe-bottom. Alkali is such a strongly absorbent or bibulous element for aiding the piece to drink in or invite quick penetration of the piece by moisture. Another type or illustration is strongly capillary fibers such as cotton fibers, especially when in a semi-dehydrated state. These bibulous elements stiffen the laid filler later. And I have previously mentioned naphthalene as a solvent of the wax tailings binder aiding the spreading and then stiffening the laid filler layer. While the rolling action is preferable, and in the initial anchoring of the piece at its middle followed by the progressive spreading thereof, and the surface waxing and wax transference to the upper, or anti-squeak process above set forth, said rolling action is essential as to certain of the more limited claims hereinafter, it will be understood that vertical pressure may be employed where not otherwise specified in the claims. In my method application Ser. No. 210,558 such vertical pressure is claimed broadly. In said last mentioned application I have set forth and claimed also the feature of rendering inherently stiffer the laid filler by means of heavy pressure treatment, as by means of providing colloids, emulsions, and the like in connection with absorbent components, so that the absorbent component receives by absorption the ingredient when released by said pressure. Said case also covers the cold spreading feature, but the generic claims to spreading, pressure spreading, stiffening, pressure stiffening, decreasing heat-responsiveness, anti-squeak treatment, and various other features broadly are intended to be contained in the present application. A word as to the feature of increasing the heat resistance or decreasing the heat responsiveness of the laid filler as compared with the original piece or with its condition while being laid. The wax tailings commonly used in this spreadable type of filler, in order to get easy spreadability, has always been selected with a low melting point. This aids the operation of shoe filling, but leaves the laid filler responsive more or less to the heat of the foot in use and hence liable to bunch and shift in the shoe-bottom. Accordingly, I preserve the facility and advantage of the high plasticity and spreadability for use in laying the filler, and then I stiffen the filler after it is laid and, when the low heat responsiveness is no longer desirable but is an objection, I neutralize said responsiveness or at least decrease the same, so that the laid filler layer is no longer low heat responsive, but is either not responsive at all or only to a high heat. This can be done by many means, and the one I prefer to rely upon is the introduction of a relatively large amount of stiffeners of the kind enumerated which, when their solvent has evaporated, or they have set, are not responsive to heat. And yet when first quickened their watery, slimy, slippery condition greatly facilitates the spreading operation. Also, later, the interaction and interlacing of the set stiffener and the always elastic wax tailings prevents the former from ever becoming brittle and maintains the desired coherence and flexibilty of the entire layer. The same general kind of cooperation insures that the piece shall be spreadable for laying and preferably not spreadable thereafter. By the term "plastic piece" I mean a strongly coherent, cohesive piece, blended to a self-sustaining compactness, which is spreadable at the time of laying, preferably by a quickening treatment, irrespective of whether capable of spreading before or of spreading after said time of laying. For instance in certain of my applications, I mention fusible binders for example, shellac, resins, etc. which are usually not spreadable except under heat treatment. The terms herein used are employed in the same sense and with the same definition as in my other copending applications noted, as for instance the words sheet, piece, expansible, spreadable, plastic layer, skin and cover, are defined in my application Ser. No. 133,506. My method claims herein are intended to cover the use of all the varieties of my filler pieces in the various copending applications, so far as applicable, and I here refer to and make a part hereof the references and descriptions of my various features or steps herein claimed which are further set forth in all of said copending applications. The expanding, preferably by spreading a plastic layer, beyond the bottom support 3 is set forth in my application Ser. No. 210,558 whence the broader claims have been transferred to the present application, including those for the latent adhesive, internal and external (by which I mean adhesive or sticky elements not directly available or active in the commercial piece but requiring quickening treatment of some kind for making them actively available at the time of the shoe-bottom filling operation). By surrounding the bottom support or protecting skin with filler material stuck to the bottom of the cavity all around said skin the latter is held immovable and the piece is rendered permanently unchangeable or unshiftable in position.

The ideal shoe-bottom is a unitary or substantially single piece bottom, and, as explained in my last mentioned application this is secured by my method by providing a filler piece capable of sticking tenaciously to both sides of the bottom cavity, that is to say, to the upper side of the innersole and the lower or innerside of the outer sole (as treated, bottomside up, in the shoe factory) which result is secured simply by the step of pressure. With certain of my commercial forms of filler pieces it is necessary to employ also a heat treatment, which may be strictly cementitious (as in my application Ser. No. 228,588), or not cementitious, or may be otherwise, as for instance dry heat, moist heat, or moisture alone.

One of the distinguishing features of my method, in its broad aspects resides in providing a plastic, self-supporting filler unit or piece, preferably in the form of a coherent, individual piece having inherent integrity adapting it to the filler requirements of an individual shoe and preferably rendering it capable of being handled integrally, so as to be placed as a piece in the shoe-bottom and then spread therein, so far as the piece is plastic or spreadable, to bottom forming position by means of pressure. This step in my method is applicable to all the spreadable filler pieces of my above mentioned applications as fully stated therein. Various of these filler pieces are amenable to quickening treatment as already explained, and the body material may be on the outside before the said quickening (the heat treatment for instance) or it may be secured thereto in the course of heat treatment by dipping or otherwise (as in Ser. No. 228,588) and the heat treatment may be liquid or it may be simply dry heat treatment. With such heat influenced filler pieces as are contained in my application Ser. No. 183,302 or the further species thereof in Ser. No. 232,279 the dipping or other quickening treatment is preferably in hot water. This is especially desirable when the piece contains latent adhesive, especially when on one side and waxy antisqueak material on the other side, and also especially when the latent adhesive is also internal. Dipping such a piece in hot water renders active the latent adhesive (dextine for example) as well as softening the spreadable portion of the piece and then the waxy or anti-squeak surface of the piece is quickened with dry heat as by the hot roll 21. Such a piece is set forth and claimed in my application Ser. No. 183,302. In such instances my method comprises the step of providing a plastic, self-supporting filler piece and then subjecting said piece of a quickening process, preferably hot moisture, and while the piece is thus quickened as a piece spreading the same in the shoe-bottom. Preferably the spreading develops the anti-squeak material, such for example as when the top surface is impregnated with wax or the filler body contains wax, as for instance wax tailings, brought to the surface by the heat and the pressure. When the anti-squeak material relied upon is the internal binder of the spreadable element the hot roll brings the binder to the surface in permanently active condition. In case the filler piece, quickened by a dipping in water or other moisture treatment, preferably hot moisture, has an internal part for maintaining cohesion and an external layer of spreadable filler material, (for instance as in my application Ser. No. 232,279 and Ser. No. 228,236), the roll or other pressure-applying device spreads said external layer with relation to the internal part and brings the same to bottom forming position more readily because of the quickening step in the process. This quickening may be prior to the application of the piece to the shoe-bottom or simultaneously with the spreading step (especially in case of dry heat quickening).

As already pointed out, in many respects this present application is foundational and is intended to contain claims generic to the various methods disclosed in my other copending applications, and accordingly it will be understood that except as otherwise required in the claims the latter are intended to be broad and the various steps above described are intended to be used and covered as single steps irrespective of whether used in connection with other steps herein mentioned or not, and without restriction as to the sequence of steps unless expressed or required by the context, and the various steps are intended to be covered and claimed in a wide range of combinations and connections.

I claim,

1. The method of filling shoes, which comprises providing a filler piece of plastic, spreadable, cohesive filler material, compressed to render it compacted and self-sustaining, said filler piece being of a volume suitable for filling a single shoe bottom cavity and capable of being rendered easily spreadable by a loosening treatment, rendering said piece spreadable by said loosening treatment, placing said piece in the shoe bottom cavity so as to occupy a portion only of the cavity to be filled thereby, and then spreading said piece to its bottom filling position.

2. The method of filling shoes, which comprises providing a filler piece of plastic, spreadable, cohesive filler material, compressed to render it compacted and self-sustaining, said filler piece being of a volume suitable for filling a single shoe bottom cavity and said piece being rendered sufficiently stable, durable, firm and handleable for shipping, storage and commercial requirements and yet capable of being rendered easily spreadable by a loosening treatment, rendering said piece spreadable by said loosening treatment, placing said piece in the shoe bottom cavity so as to occupy a portion only of the cavity to be filled thereby, and then spreading said piece to its bottom filling position and finally restoring the spread piece again to its compressed condition.

3. That method of filling shoes, which comprises as steps, providing a plastic, cohesive, filler piece blended and compressed to self-supporting compactness adapted to the filling requirements of an individual shoe and capable, as an article of manufacture, of being handled integrally, placing said filler piece as a piece in the shoe-bottom, and spreading said plastic piece to bottom-forming position by means of pressure.

4. The method of filling shoes, comprising providing the filler material in the form of plastic, standard shaped pieces, shape-retaining for transportation and handling, which are at least in part expansible and are self-sustaining, dense and impervious units to the extent of being stable and capable of being handled and applied integrally as pieces in the shoe-bottom but having individually less area and greater thickness than the shoe-bottom cavity, and then expanding said piece to the particular shape and size of said shoe-bottom cavity.

5. The method of filling shoes, comprising providing the filler material in the form of plastic, standard shaped pieces which are at least in part expansible and are self-sustaining, cohesive, compact and impervious, and capable of being handled and applied integrally as pieces in the shoe-bottom but having individually less area and greater thickness than the shoe-bottom space to be filled, placing the aforesaid standard piece in the shoe-bottom cavity, and then expanding said piece by pressure to the particular shape and size of said shoe-bottom cavity.

6. That method of filling shoes, which comprises applying as a piece a self-maintaining cohesive, dense, self-supporting piece of filler material to the bottom of a shoe, being then at least in part plastic and being of a shape non-coincident with that of the cavity of the shoe, and subjecting said piece to pressure sufficient to cause it to spread and fill the said cavity.

7. That method of filling shoes, which comprises as steps, providing a plastic, cohesive, compact and impervious, self-supporting filler piece, amenable to a quickening process, so quickening said piece, and, at some stage in the shoe filling operation, applying said quickened filler piece to the shoe-bottom as a piece, and subsequently spreading the same in the shoe-bottom.

8. That method of filling shoes, which comprises as steps, providing a plastic, cohesive, compact and impervious, self-supporting filler piece, having a substantially dry cover layer which is amenable to a quickening process, so quickening said cover layer, and, at some stage in the shoe filling operation, applying said filler piece to the shoe-bottom, and while the cover layer is quickened as aforesaid spreading said piece in the shoe-bottom.

9. That method of filling shoes, which comprises as steps, providing a plastic, spreadable, cohesive, compact and impervious, self-supporting filler piece, amenable to a heat quickening process, so quickening said piece, applying said filler piece to the shoe-bottom as a piece at some stage of the bottom forming process, and while the piece is quickened as aforesaid spreading the same in the shoe-bottom.

10. That method of filling shoes which comprises as steps, providing a plastic, cohesive, compact and impervious, self-supporting filler piece, having at least one side coated with comminuted powdery surfacing material, and amenable to a quickening process, so quickening said piece, and while the piece is thus quickened spreading the same in the shoe-bottom.

11. That method of filling shoes, which comprises as steps, providing a plastic, cohesive, compact and impervious, self-supporting filler piece, amenable to a moisture quickening process, so quickening said piece, applying said filler piece to the shoe-bottom as a piece at some stage of the bottom forming process, and while the piece is quickened, as aforesaid, spreading the same in the shoe-bottom.

12. That method of filling shoes, which comprises as steps, providing a plastic, cohesive, self-supporting filler piece, amenable to a hot moisture quickening process, so quickening said piece, applying said filler piece to the shoe-bottom as a piece at some stage of the bottom forming process, and, while the piece is quickened as aforesaid, spreading the same in the shoe-bottom.

13. The herein described method of filling shoes, comprising providing a filler piece which is cohesive, compact and impervious, and which contains, at least on one side, means capable of being rendered actively sticky by a quickening treatment, subjecting said piece to said quickening treatment, applying said piece to the shoe-bottom, and securing the same by pressure.

14. That method of filling shoes, which comprises as steps, providing a plastic, cohesive, compact and impervious, self-supporting filler piece, having at least one side coated with substantially dry inactive stiffening filler material, and amenable to a quickening process, so quickening said piece, sufficiently at least to render said inactive stiffening filler material active, and while the piece is thus quickened spreading the same in the shoe-bottom.

15. That method of filling shoes, which comprises as steps, providing a self-supporting filler piece having on one side and within it a latent adhesive, rendering said adhesive active by exposure to moisture, and then applying said piece to the shoe-bottom, spreading the same and applying the outer sole, so that the spread filler piece is ultimately between the outer sole and innersole with its side having the active adhesive against one of said soles.

16. The method of filling shoes which comprises providing a filler piece having a plastic, spreadable layer of shoe filler material and a non-relaxing carrier, and then using said carrier as a shape-maintaining means, integrity support, and aid in handling the piece and in its treatment prior to laying the piece in the shoe-bottom, and then laying the piece in the shoe-bottom, and, in connection with the step of laying the piece, placing said carrier as a permanent filler element against the innersole.

17. That method of filling shoes, which comprises as steps, providing a self-supporting filler piece having on one side a latent adhesive stiffener and on the other side a self-supporting cover, rendering said adhesive active by exposure to moisture, then applying said piece to the shoe-bottom and applying the outer sole so that the filler piece is ultimately between the outer sole and innersole with said supporting cover against one of said soles.

18. That method of filling shoes, which comprises as steps, providing a plastic, self-supporting, adhesive filler piece having on one side a supporting cover, quickening said piece by exposure to moisture, applying said piece to the shoe-bottom, and applying pressure thereto in the shoe-bottom.

19. That method of filling shoes, which comprises as steps, providing a plastic, self-supporting filler piece which is amenable to heat, and which contains means responsive to quickening treatment for rendering the piece less responsive to heat, subjecting said piece to said quickening treatment at some stage in the filler laying process, applying said piece to the shoe-bottom and spreading the same to laid condition therein.

20. That method of filling shoes, which comprises as steps, providing a self-sustaining, cohesive filler piece capable of being handled and applied to the shoe-bottom as an integral piece, and normally amenable to heat, and capable of being spread in the shoe-bottom and containing means for decreasing said heat responsiveness, spreading said piece in the shoe-bottom, and at some time in the process changing the heat responsiveness as aforesaid.

21. That method of filling shoes which comprises as steps, providing a self-sustaining, spreadable filler piece which is normally amenable to low heat, and containing means convertible into a non-heat responsiveness, spreading said piece in the shoe-bottom and at some stage in the process converting said convertible means into its non-heat responsive condition so as thereby to raise the temperature responsiveness of the piece.

22. That method of filling shoes, which comprises as steps, providing a spreadable, self-supporting, coherent filler piece, responsive to heat for rendering the piece spreadable in the shoe-bottom, and containing means for neutralizing a portion of said heat responsiveness, applying and spreading said piece in the shoe-bottom, and at some time in the process rendering said neutralizing means effective for changing the heat responsiveness of the laid filler piece.

23. That method of filling shoes, which comprises as steps, providing a plastic, self-supporting filler piece, having an expansible portion and an inextensible supporting portion for giving tensile strength and integrity to the piece, placing said piece in the shoe-bottom, and expanding said piece beyond its original shape sufficiently to engage an adjacent surface of the shoe-bottom with the expansible portion beyond the said supporting portion of the filler piece.

24. That method of filling shoes, which comprises applying to the bottom of a shoe a filler piece which includes a layer of sticky shoe filler material having an outer skin on at least one side, and applying pressure to said piece sufficient to cause said sticky layer to spread beyond the edges of said skin and to cause the piece to adhere strongly in place.

25. That method of filling shoes, which comprises as steps, providing filler pieces, individually suited to fill a single shoe, and amenable to a moisture quickening, subjecting said pieces to moisture until they are quickened, then subjecting the pieces to a quick heating process to drive said moisture appreciably into each piece, and immediately placing the quickened pieces into position in the shoe-bottom and securing the same.

26. That method of filling shoes, which comprises providing a filler piece containing latent incipient paste-producing elements, capable of being rendered active by a steaming process, giving said piece a pretreatment in moisture to soften the piece and develop the incipient paste, then subjecting the softened piece to a heating treatment until the incipient paste is developed into a sticky adhesive, placing said piece in a shoe-bottom and securing the same therein.

27. That method of filling shoes, which comprises as steps, providing a filler piece amenable to softening treatment by moisture, moistening said piece, and sliding the moistened piece over a slide surface into the shoe-bottom.

28. That method of filling shoes, which comprises as steps, providing a filler piece amenable to softening treatment by moisture, moistening said piece, subjecting said moistened piece to a steaming heat, and moving the same mainly without appreciable manual handling from the steaming treatment into the shoe-bottom.

29. That method of filling shoes, which comprises as steps, providing a filler piece which contains a shape-maintaining portion and a deformable portion, placing said piece in a shoe-bottom, and then spreading the deformable portion beyond the shape-maintaining portion into cavity occupying position while retaining the shape maintaining portion as placed.

30. As steps in the herein described method of filling shoes, each such step to be performed at some stage in the process prior to the insertion of the filler piece in the shoe-bottom, providing a strongly coherent paper-like support of the shape, and as the chief shape-maintaining means, of the individual filler piece, providing a molded mass of plastic filler material in quantity and molded shape to fill a shoe-bottom in connection with said support, and uniting said support and molded mass together into a self-supporting, plastic filler piece required to fill a single shoe-bottom and as a further step after the filler piece is placed in the shoe bottom cavity, spreading the plastic filler material beyond the edges of the support to the confines of the cavity.

31. The herein described step in bottoming shoes, comprising providing, within the shoe-bottom, filler material containing excess binder and a coating of an absorbent body material capable of absorbing said excess binder, and heating the filler material to render the binder more fluid so as to hasten the absorption of said excess binder.

32. That method of filling shoes, which includes as steps, placing a filler piece in the shoe-bottom, in connection with means for causing adherence, and then bringing a heavy vertical transverse pressure on the free side of said piece at about the transverse middle of its length to cause the piece to adhere without shifting, and then causing an advancing pressure endwise of the piece.

33. That method of filling shoes, which includes as steps, placing a filler piece in the shoe-bottom, in connection with means for causing its adherence therein, and then pressing a roll against the free side of said piece first with a vertical pressure across about the middle of the length of the filler piece and then advancing with a rolling pressure endwise of the piece in one direction, and then back again to said middle region and continuing in the opposite direction.

34. That method of filling shoes, which includes as steps, placing a filler piece in the shoe-bottom, in connection with means for causing its adherence therein, and then applying pressure to the free side of said piece by means of a roll, and applying special pressure lengthwise along the longitudinal middle of the piece for preventing lateral shifting or twisting.

35. That method of filling shoes, which includes as steps, placing a filler piece in the shoe-bottom, in connection with means for causing adherence therein, and then applying pressure to the free side of said piece by means of a roll, and applying special pressure lengthwise along the longitudinal middle of the piece and simultaneously rolling the piece lengthwise for giving also a widthwise spreading impulse to the piece in opposite directions from said longitudinal middle.

36. The herein described method step in bottoming shoes, comprising providing in the shoe-bottom a filler layer containing anti-squeak material, subjecting said layer to heat and pressure to form a film of said anti-squeak material on the surface of said layer and by the same operation to transfer from the layer to the adjacent portion of the inturned upper a portion of said anti-squeak material.

37. The method of filling shoes which comprises placing in the bottom cavity of a shoe a piece of plastic filler material which is permanently cohesive, spreadable at least in part, compressed and compacted into a piece which is sufficiently firm, stable and durable for commercial handling, said piece having a mass suitable for filling a single shoe bottom cavity and an area less than that of the cavity and a thickness greater than the depth of the cavity, and then spreading the piece to the increased area and reduced thickness required to conform to the shape and dimensions of the cavity.

Signed by me at Cambridge, Massachusetts, this 21st day of December, 1927.

ANDREW THOMA.